_UNITED STATES PATENT OFFICE._

HEINRICH BRUNE AND HEINZ HORST, OF FRANKFORT-ON-THE-MAIN, GERMANY, ASSIGNORS TO THE CORPORATION OF GESELLSCHAFT FÜR MASCHINELLE DRUCK-ENTWÄSSERUNG MIT BESCHRANKTER HAFTUNG, AT UERDINGEN, NIEDERRHEIN, GERMANY.

UTILIZING COAL SLIMES.

1,416,546.    Specification of Letters Patent.    Patented May 16, 1922.

No Drawing.    Application filed June 30, 1920. Serial No. 393,212.

*To all whom it may concern:*

Be it known that we, HEINRICH BRUNE and HEINZ HORST, citizens of Germany, and residents of Frankfort-on-the-Main, with the post-office address Schleiermachersstrasse 46, and of Dortmund, with the post-office address Schwanenwall 48, respectively, Germany, have invented new and useful Improvements in Utilizing Coal Slimes, (for which I have filed applications in Germany November 6, 1916; application No. 165,583; Hungary February 17, 1920; Austria February 6, 1920; Czecho-Slovakia March 17, 1920, and Poland on or about February 7, 1920,) of which the following is a specification.

Coal slimes, coke breeze and the so-called middle products constitute coal wastes and are of very little use as fuel because of their characteristic properties, notwithstanding that they contain a considerable proportion of carbon.

In the case of slimes the tough gummy condition in which they are obtained by deposition in the settling tanks is a hindrance to the stoking operation and to combustion of fuel, in addition to which the water remaining in them diminishes their heating value.

Coke breeze burns with extraordinary difficulty on account of the small size of its particles which cause it to pack in the fire, so that the natural chimney draught does not suffice to draw enough air through the layer of fuel for proper combustion. It can only be burnt with aid of a blast which considerably diminishes its true heating value.

The same remarks apply to the middle products.

By the present invention the physical condition of the fuels in question is so changed that they can be used as fuel of high value.

It has been proposed to mix the settled slimes with coke breeze and to expel the water in the mixture by pressure so as to make the mixture suitable for combustion; also to clarify water containing suspended slimes by a coke filter so as to obtain a mixture of slimes and coke. Processes of this kind are of little technical importance.

While the method of filtration through coke does not lead to a useful combustible product but necessitates a further operation to improve the product, the known processes of mixing coal slimes are so difficult owing to the unsuitable properties of the settled slimes that they have scarcely been applied on a large scale. The slimes during their deposition in the settling tanks acquire such a tough gummy character that in this condition they can be mixed with coke breeze only with difficulty and the mixture cannot easily be pressed. The smallest particles have assumed, in consequence of the layer formation, a definite relative position and present considerable resistance to any movement among themselves. Thus it becomes very difficult to mix the settled slimes with coke breeze and to overcome their tendency to maintain their layer formation, which is very unfavourable for expressing water.

The present invention improves this state of the art by not starting from the settled slimes, that is to say it does not follow the attempts which have always been hitherto made to concentrate the solid particles by removing from them as much as possible of the water which was used to wash the coal before treating it further. In spite of the apparent disadvantage of having to deal with considerable masses of water the present invention treats the fluid slimes, the particles of which present the least resistance to movement among themselves, that is to say the fluid slimes are mixed by agitation with coke breeze or middle products and this fluid is freed from water by pressure. In spite of the fundamentally different physical properties of this fluid from those of the aforesaid mixture of settled slimes and coke breeze it is possible to remove water from the fluid mass by pressure. Indeed a more complete removal is possible on account of the greater freedom with which the water can flow away from the interior of the mass under pressure to the outer surface thereof, since the solid particles can move relatively to each other during the pressing and thus channels can be formed within the mass.

The compressed blocks are more uniform in character than those from the settled slimes both in respect of their content of moisture and in the degree of intermixture of the coke breeze with the dry material of the slimes now free from water. Thus the product is of higher value because it comprises the uniformity of intermixture which is correct for combustion. Each particle of coke breeze is sufficiently coated with the dry slime substance and is baked solid during the combustion. Solid masses of grains of coke breeze, which have their origin in the separation of unburnt coke breeze during the firing on account of insufficient intermixture with the caking slimes, are completely avoided.

The new process is of the greatest simplicity since the fluid slimes lend themselves to any mechanical handling and the consumption of power is limited to a very small proportion. The recognition of the fact that fluid slimes are suitable as the raw material for making briquettes from coal slimes and coke breeze which have the known satisfactory properties in a furnace, for the first time makes a certainty of the production of these valuable briquettes on a large scale. Experience has shown that the working up of settled slimes is nearly impossible and necessitates considerable outlay for mixing apparatus and supply of power.

Finally, the proportion between coal slimes and coke breeze in the mixture which is to be pressed for expulsion of water in accordance with this invention may be varied within such wide limits that it is possible to use both these products in all proportions in which they are likely to occur without residue; this was not possible in the processes hitherto known because of the unfavourable character of the tough settled slimes.

Having thus fully described the nature of the said invention and the best means we know of carrying the same into practical effect, we claim:—

The process of preparing fuel which consists in mixing fluid coal slimes with coke breeze before the slimes have settled and then expressing the water from the mixture.

In testimony that we claim the foregoing as our invention, we have signed our names this fourth day of June 1920.

HEINRICH BRUNE.
HEINZ HORST.